(12) United States Patent
Dhiman et al.

(10) Patent No.: US 10,961,132 B2
(45) Date of Patent: Mar. 30, 2021

(54) WATER PURIFICATION CARTRIDGE

(71) Applicant: 3M INNOVATIVE PROPERTIES COMPANY, St. Paul, MN (US)

(72) Inventors: Rajeev Dhiman, Pleasanton, CA (US); Justin M. Mazzoni, Cheshire, CT (US); Michael E. Griffin, Maplewood, MN (US); Hemang Patel, Middletown, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/326,588

(22) PCT Filed: Aug. 28, 2017

(86) PCT No.: PCT/US2017/048859
§ 371 (c)(1),
(2) Date: Feb. 19, 2019

(87) PCT Pub. No.: WO2018/048654
PCT Pub. Date: Mar. 15, 2018

(65) Prior Publication Data
US 2019/0225509 A1    Jul. 25, 2019

Related U.S. Application Data

(60) Provisional application No. 62/384,905, filed on Sep. 8, 2016.

(51) Int. Cl.
*C02F 1/32* (2006.01)

(52) U.S. Cl.
CPC ........ *C02F 1/325* (2013.01); *C02F 2201/006* (2013.01); *C02F 2201/008* (2013.01);
(Continued)

(58) Field of Classification Search
CPC ............... C02F 1/325; C02F 2201/006; C02F 2201/3222; C02F 2201/3228; C02F 2201/328; A61L 2/10
See application file for complete search history.

(56) References Cited

U.S. PATENT DOCUMENTS 4,255,383 A * 3/1981 Schenck .................. A61L 2/10
                                                       422/24
4,899,057 A   2/1990 Koji
(Continued)

FOREIGN PATENT DOCUMENTS

CN       204017645      12/2014
DE    10 2014 015642     4/2016
(Continued)

OTHER PUBLICATIONS

Song, "Application of Ultraviolet Light-Emitting Diodes (UV-LEDs) for Water Disinfection: a Review", Water Research, 2016, vol. 94, pp. 341-349.
(Continued)

Primary Examiner — Wyatt A Stoffa
(74) Attorney, Agent, or Firm — Scott A. Baum

(57) ABSTRACT

A UV treatment cartridge having an exterior housing and a UV treatment module located inside of the exterior housing. The UV treatment module having a UVLED array for UV treatment of a fluid passing through the UV treatment module. An internal annular space between the exterior sidewall and the module sidewall forms an entry flow path to the UV treatment module thereby substantially balancing fluid pressure acting on the inside of the module sidewall and acting on the outside of the module sidewall.

18 Claims, 11 Drawing Sheets

(52) U.S. Cl.
CPC .......................... *C02F 2201/328* (2013.01); *C02F 2201/3222* (2013.01); *C02F 2201/3227* (2013.01); *C02F 2201/3228* (2013.01); *C02F 2303/04* (2013.01)

(56) References Cited

U.S. PATENT DOCUMENTS

| | | | |
|---|---|---|---|
| 6,940,075 B2 * | 9/2005 | Schulz | C02F 1/325 210/150 |
| 7,520,978 B2 | 4/2009 | Harbers | |
| 7,544,291 B2 | 6/2009 | Ehlers, Sr. | |
| 7,842,932 B2 | 11/2010 | Knight | |
| 8,444,918 B2 | 5/2013 | Tanaka | |
| 8,742,364 B2 | 6/2014 | Boodaghians | |
| 8,816,298 B2 | 8/2014 | Tanaka | |
| 9,017,613 B2 * | 4/2015 | Owen | A61L 9/205 422/121 |
| 2002/0074559 A1 | 6/2002 | Dowling | |
| 2002/0144955 A1 * | 10/2002 | Barak | C02F 1/325 210/748.11 |
| 2004/0238433 A1 | 12/2004 | Clark | |
| 2005/0000913 A1 | 1/2005 | Betterly | |
| 2005/0167611 A1 | 8/2005 | Elsegood | |
| 2007/0163934 A1 * | 7/2007 | Kim | B67D 3/0029 210/192 |
| 2009/0095691 A1 * | 4/2009 | Thorpe | C02F 1/325 210/748.12 |
| 2009/0250626 A1 | 10/2009 | Schlesser | |
| 2010/0187437 A1 * | 7/2010 | Ueberall | B01J 19/123 250/435 |
| 2013/0146783 A1 | 6/2013 | Boodaghians | |
| 2013/0236353 A1 | 9/2013 | Blechschmidt | |
| 2013/0319925 A1 | 12/2013 | Yee | |
| 2013/0323128 A1 * | 12/2013 | Owen | C02F 1/725 422/121 |
| 2015/0008167 A1 | 1/2015 | Shturm | |
| 2015/0060692 A1 | 3/2015 | Chen | |
| 2015/0129776 A1 | 5/2015 | Boodaghians | |
| 2015/0136671 A1 * | 5/2015 | Barnes | C02F 1/325 210/192 |
| 2015/0144575 A1 * | 5/2015 | Hawkins, II | C02F 1/325 210/748.11 |
| 2015/0314024 A1 * | 11/2015 | Khan | C02F 1/325 250/435 |
| 2015/0360924 A1 * | 12/2015 | Orita | C02F 1/78 222/190 |
| 2016/0000953 A1 * | 1/2016 | Bettles | A61L 2/24 250/455.11 |
| 2016/0185623 A1 * | 6/2016 | Hanada | C02F 1/325 250/435 |
| 2017/0304473 A1 * | 10/2017 | Farren | A23L 3/28 |
| 2017/0320755 A1 * | 11/2017 | Chen | C02F 1/325 |
| 2018/0215634 A1 * | 8/2018 | Jung | A61L 2/10 |
| 2018/0257953 A1 * | 9/2018 | Mochizuki | G05D 7/0186 |
| 2019/0135658 A1 * | 5/2019 | Yamakoshi | A61L 2/26 |
| 2019/0184045 A1 * | 6/2019 | Mochizuki | C02F 1/325 |

FOREIGN PATENT DOCUMENTS

| | | |
|---|---|---|
| KR | 10-1358277 | 2/2014 |
| KR | 101358277 B1 * | 2/2014 |
| WO | WO 2016/008799 | 1/2016 |
| WO | WO 2017-112568 | 6/2017 |

OTHER PUBLICATIONS

International Search Report for PCT International Application No. PCT/US2017/048859, dated Dec. 6, 2017, 4 pages.

* cited by examiner

US 10,961,132 B2

WATER PURIFICATION CARTRIDGE

CROSS REFERENCE TO RELATED APPLICATIONS

This application is a national stage filing under 35 U.S.C. 371 of PCT/US2017/048859, filed Aug. 28, 2017, which claims the benefit of U.S. Provisional Patent Application No. 62/384,905, filed Sep. 8, 2016, the disclosures of which are incorporated by reference in their entirety herein.

BACKGROUND

Replaceable cartridge filters of the throw away type are often interchangeably connected to a filter manifold that is secured to the appliance or machine requiring the fluid filtration. Some manifolds use quarter turn filter cartridges where approximately a 90 degree revolution of the filter cartridge engages and disengages the filter cartridge from the manifold. Such filter cartridges and manifolds are often used to supply point of use treated water to beverage dispensing applications for soda or brewed coffee.

SUMMARY

Water treatment cartridges are available with a variety of treatment media enclosed within them such as activated carbon, ion exchange media, pleated or non-pleated filtration media, porous membranes, porous hollow fibers, and the like. Radiation-based disinfection systems use short wavelength photonic emission, e.g., emission in the ultraviolet (UV) range such as 100 nm to 320 nm, to reduce microorganisms in fluids (e.g. drinking water) or on surfaces. UV radiation emitted by the source of a radiation-based disinfection system disrupts biological functions of microorganisms and retards or prevents their reproduction.

However, a compact UV replaceable treatment cartridge is not readily available. Therefore, in order to kill potential pathogens an upstream or downstream UV treatment system must be provided in addition to the replaceable treatment cartridges. It would be much more desirable and flexible to have a UV treatment cartridge that could be readily inserted or removed from a manifold to provide this function. Often treated water for coffee or soda applications undergoes several treatment steps (filtering, hardness control, chlorine removal, or etc.) provided by more than one removable treatment cartridge in series attached to a common manifold. Thus, having the UV treatment cartridge easily secured to the same common manifold would provide flexibility to the water treatment system, reduce installation costs, create a more compact water treatment system, and provide economies of scale for the manufacturer of the water treatment system.

Hence in one aspect the invention resides in a UV treatment cartridge having an exterior housing having a first exterior end, a second exterior end, and an exterior sidewall connecting the first exterior end and the second exterior end. A cartridge inlet and a cartridge outlet are located on the exterior housing. A UV treatment module is located inside of the exterior housing. The UV treatment module includes an interior housing having a module first end, a module second end, and a module sidewall connecting the module first end and the module second end and enclosing a UV treatment chamber. An array of UV light emitters directing UV light into the UV treatment chamber. The UV treatment module having a module inlet and a module outlet. An internal annular space forming an entry flow path between the exterior sidewall and the module sidewall connects the cartridge inlet to the module inlet and an exit flow path is provided from the module outlet to the cartridge outlet.

DETAILED DESCRIPTION

Figure 1:
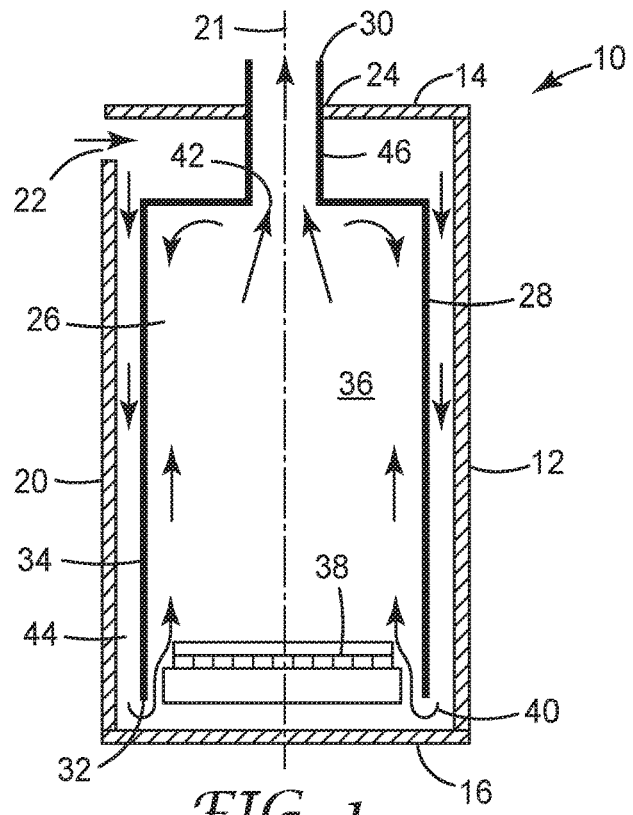
FIG. 1 illustrates a cross sectional view of one embodiment of a water treatment cartridge.
Figure 2:
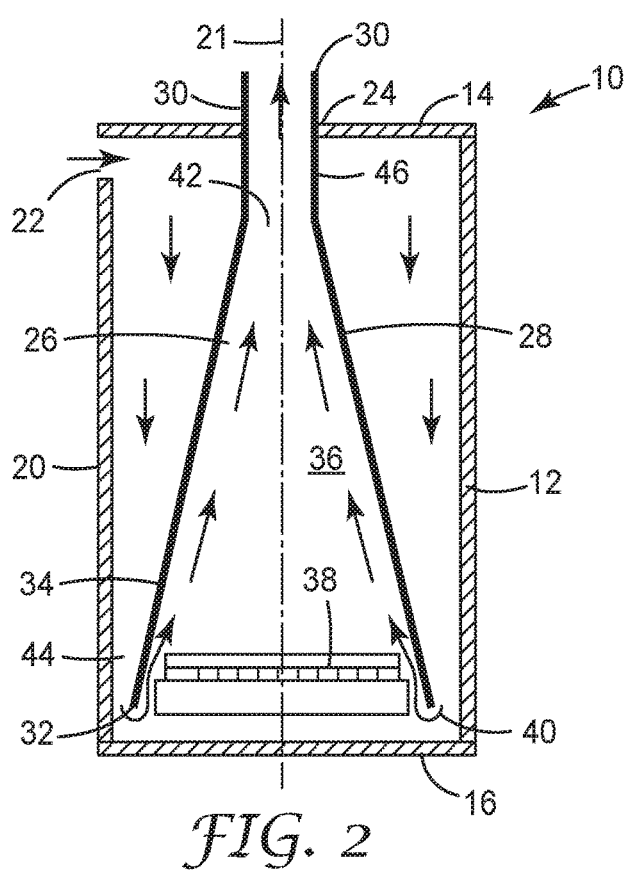
FIG. 2 illustrates a cross sectional view of another embodiment of a water treatment cartridge.
Figure 3:
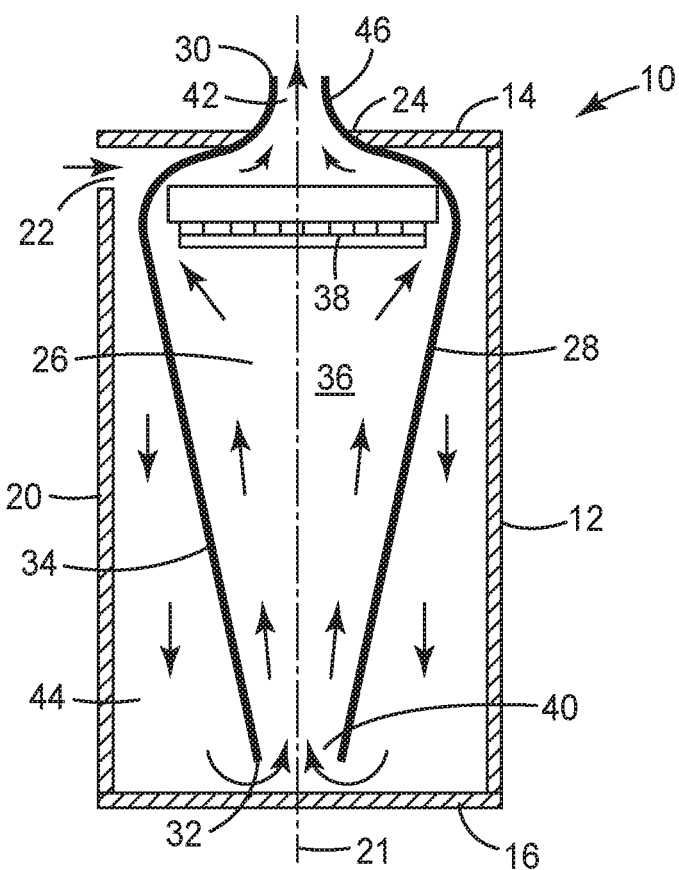
FIG. 3 illustrates a cross sectional view of another embodiment of a water treatment cartridge.

Referring now to FIGS. 1, 2, and 3, a UV treatment cartridge 10 with an exterior housing 12 having a first exterior end 14, a second exterior end 16, and a longitudinally extending exterior sidewall 20 connecting the first exterior end and the second exterior end is illustrated. A central longitudinal axis 21 is shown in each illustration for clarity. A cartridge fluid inlet 22 and a cartridge fluid outlet 24 are provided extending through the exterior housing 12 to allow for fluid to enter and exit the UV treatment cartridge. The exterior housing encloses a separate UV treatment module 26. The UV treatment module 26 includes an interior housing 28 having a module first end 30, a module second end 32, and a longitudinally extending module sidewall 34 connecting the module first end 30 and the module second end 32 and enclosing a UV treatment chamber 36. An array of UV light emitters 38 are located adjacent to either the module first end or the module second end directing UV light into the UV treatment chamber 36. A module fluid inlet 40 and a module fluid outlet 42 are provided to allow for fluid to enter and exit the UV treatment module 26. The UV treatment cartridge further includes an internal annular space 44 forming an entry flow path between the exterior sidewall 20 and the module sidewall 34 fluidly connecting the cartridge fluid inlet 22 to the module fluid inlet 40 and a fluid exit flow path 46 from the module fluid outlet 42 to the cartridge fluid outlet 24. In some embodiments, the module fluid outlet 42 and the fluid exit flow path 46 extend through the exterior housing 12 forming the cartridge fluid outlet 24.

The internal annular space 44 provides a useful function in that the module sidewall 34 is not subjected to a significant pressure differential in use since pressured fluid is present on both sides of the module sidewall 34. The annular space does not have to be a uniform ring or circular cross section (see for example FIGS. 2, 3, and 10), but should allow for substantially balanced pressure across the module sidewall 34. The internal annular space can taper or vary in cross sectional area and/or shape. In various embodiments of the invention, the pressure differential on the module sidewall is less than 20 psi, less than 10 psi, less than 5, psi, less 2 psi, less than 1 psi, or 0 psi, or approximately the same pressure. Thus, the module sidewall 34 can be designed to withstand much less pressure differential than the exterior sidewall 20, which can often see pressure differentials of more than 30 psi, more than 50 psi, or even more than 100 psi. As such, suitable materials for the module sidewall do not have to withstand high pressure differentials and the chosen material can have a much smaller thickness than the exterior sidewall.

Preferable module sidewall materials may be either diffusely or specularly reflective to UV light for enhanced antimicrobial treatment of fluids within the treatment chamber with specular materials reflecting the UV light at the same reflected angle along its surface and diffuse materials reflecting the UV light in a multitude of directions and angles. Specular UV materials can exhibit at least 30%, at least 40%, at least 50%, at least 60%, at least 75%, or at least 90% specular reflectivity to UV light in the range of 100 nm to 320 nm. Diffusive UV materials can exhibit at least 30%, at least 40%, at least 50%, at least 60%, at least 75%, or at least 90% diffusive reflectivity to UV light in the range of 100 nm to 320 nm. For example, polished aluminum may exhibit 90% specular reflectivity from a highly polished aluminum surface while a rougher aluminum surface finish may act diffusively to UV light. In any event, whether specular or diffuse, the suitable module sidewall material can be at least 70%, at least 80%, at least 90%, or at least 100% opaque to UV light such that UV light generated within the UV treatment module is mainly contained within the UV treatment module and does not pass through the module sidewall. As such, the material forming the exterior housing does not necessarily have to be UV light stable since it can be exposed to lower levels of UV light or no UV light. For example, a 0.1 mm thick aluminum foil forming a layer of the module sidewall surface is opaque to UV light transmission. Additional suitable module sidewall materials are discussed later with regard to FIG. 4.

In some embodiments, the UVLED array is fluidly sealed from contact with the liquid to be treated and the UV light passes through a UV transparent material. UV transparent materials are substantially transparent to UV light in the range of 100 nm to 320 nm and can include quartz, fused silica, and sapphire.

The transverse cross section of the exterior housing or the interior housing can be any suitable geometric shape and may be different from each other, but are often circular or oval. As seen, comparing FIGS. 1, 2, and 3, the treatment chamber 36 may taper having a larger cross sectional area on one of its ends than on the opposing end along the longitudinal axis. In FIG. 1, the treatment chamber 36 is enclosed by a module sidewall 34 comprising a straight cylinder that has an outlet stem passing through the cartridge fluid outlet 24 in the first exterior end 14. In alternative embodiments, the module sidewall 34 can comprise a truncated cone with the smaller end oriented upwards relative to gravity as seen in FIG. 2 and liquid flow within the module is from the larger cross sectional area to the smaller cross sectional area along the longitudinal axis, or the smaller end of the truncated cone can point downwards relative to gravity as seen in FIG. 3 and liquid flow within the module is from the smaller cross sectional area to the larger cross sectional area along the longitudinal axis. Having a tapered treatment chamber 36 where the cross sectional area decreases along the longitudinal axis can provide several advantages to the straight wall cylinder of FIG. 1. The UV intensity may be more uniformly distributed and fluid vortices and the resulting dead zones at the cylinder end opposite the UV array of FIG. 1 can be avoided. Less material is needed to form the treatment chamber which can be more cost-effective. Additionally, the geometry of FIG. 3, where the UV array is positioned toward the top of the treatment chamber relative to gravity such that gravity does not cause particles to settle onto the UV array, has the advantage of less particle settlement and fouling on the UV array which can have an adverse effect of reducing UV treatment of the fluid.

As noted above, since the module sidewall has fluid on both sides at a similar pressure, the module sidewall and the interior housing does not need to act as a pressure vessel. If the UV treatment module was not used in an exterior housing, the interior housing would need to be stable and opaque to UV and capable of withstanding the operating pressure of the pressure vessel. This would require the use of a more expensive sidewall material such as stainless steel. The internal UV treatment module design decouples these two requirements and the exterior housing does not necessarily need to be stable and opaque to UV light. Therefore the exterior housing can be made from less expensive polymeric materials that can accommodate the operating pressure of the fluid treatment cartridge but may degrade over time if exposed to UV light. The interior housing can also be polymeric but does not need to act as a pressure vessel. Therefore the module sidewall can be made from UV stable materials such as PTFE with an additional UV opaque layer if needed on the outside surface or another polymer material with a UV opaque layer on the inside surface. Preferably these layers are UV reflective (specular or diffuse) which will have the added advantage of increasing the UV dose to the liquid by minimizing UV absorption in the wall and instead directing it back towards the liquid.

In some embodiments, the interior housing and module sidewall 34 can be made from a single material. The interior housing and module sidewall 34 may be made of thin-walled metallic materials such as stainless steel, nickel, and anodized aluminum since the pressure differential across the module sidewall is low or zero. These materials have the advantages of being stable and opaque to UV, compatible with drinking water, and excellent for UVLED cooling due to their high thermal conductivities.

Figure 4A:
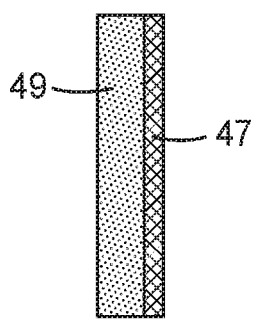
FIG. 4A illustrates an embodiment of a cross section for the module sidewall.
Figure 4B:
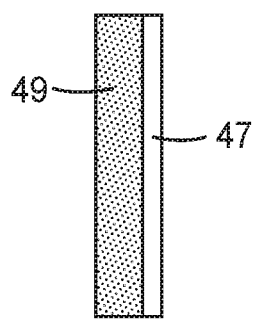
FIG. 4B illustrates another embodiment of a cross section for the module sidewall.

In some embodiments, the interior housing and module sidewall 34 may be a composite material or multilayer material made by layering different materials as shown in FIG. 4. In FIG. 4A, a UV opaque inner layer 47 forms the inside of the module sidewall and is disposed over a backing layer 49 forming the outside of the module sidewall whereas in FIG. 4B the backing layer 49 is UV opaque and the inner layer 47 is UV transparent.

In FIG. 4A, the inner layer 47 that is exposed to the UV light is a UV opaque material and is preferably UV reflective as well. For example, the inner layer 47 may be an aluminum foil with its shiny side facing the UV light. The inner layer 47 may also be made from any thin sheet of metallic material such as stainless steel. The backing layer 49 can be made from any liquid compatible material such as polyvinylchloride (PVC) or polypropylene (PP) and may be thicker than the inside layer for mechanical rigidity and assembly. A suitable construction adhesive can be used to join the two layers.

FIG. 4B shows possible embodiments where the inner layer 47 of the module sidewall is made from UV transparent or UV diffusive materials such as quartz or PTFE. The backing layer 49 may be made from metallic materials such as stainless steel or aluminum or even polymers as long as they are UV stable, opaque, and do not introduce any undesirable characteristics to the product or the treatment process. The backing layer 49 is preferably UV reflective too, for example, by making it from aluminum foil or laminated aluminum foil. A suitable construction adhesive can be used to join the two layers.

Figure 4C:
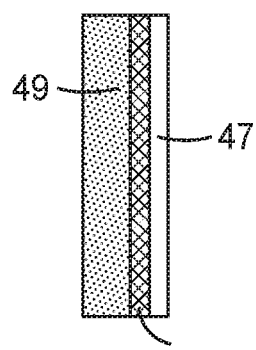
FIG. 4C illustrates another embodiment of a cross section for the module sidewall.
Figure 5:
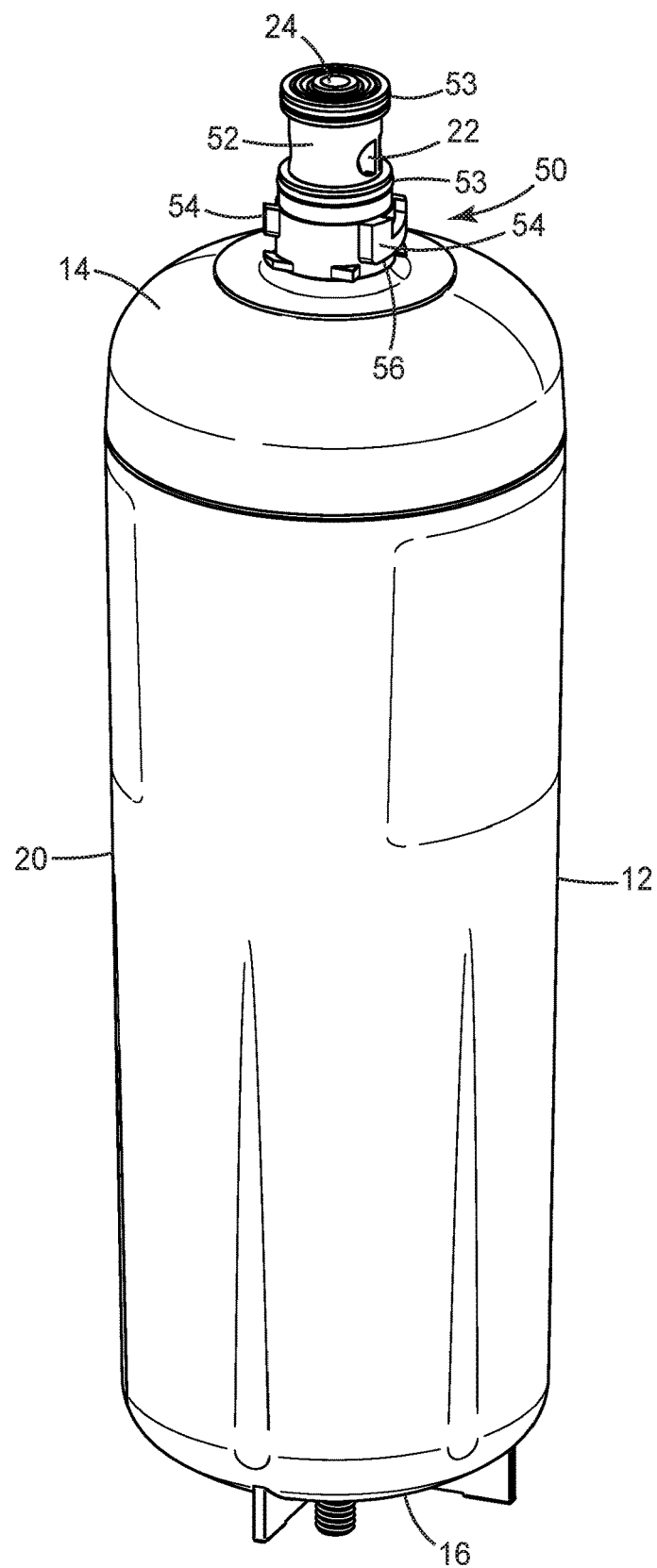
FIG. 5 illustrates a perspective view of another embodiment of a water treatment cartridge.

The module sidewall 34 wall may also be made from more than two layers. One embodiment is shown in FIG. 4C where the inner layer 47 is UV transparent, a center layer 51 is UV opaque and preferably UV reflective, and the backing layer 49 is added for mechanical rigidity and assembly. Thus, if the UV opaque layer is not suitable for direct contact with the liquid, it can be sandwiched between two other layers that are suitable for direct contact with the liquid. A suitable construction adhesive can be used to join the two layers. One example of such a construction is where the inner layer 47 is PTFE, the center layer 51 is an aluminum foil and the backing layer 49 is PVC. In an alternative embodiment, the durability and liquid-compatibility of the aluminum foil center layer 51 can be also enhanced by laminating it between two thin sheets of a fluoropolymer, such as PTFE or a polymer of tetrafluoroethylene, hexafluoropropylene and vinylidene fluoride (THV).

In many embodiments, the multilayer sidewall will include at least one opaque layer and at least one other layer such as a backing layer for mechanical strength. In many embodiments, the opaque layer will be covered on both sides by at least one other layer. In many embodiments, the multilayer sidewall will include at least one UV transparent layer and that layer can cover the UV opaque layer and preferably the UV opaque layer is reflective to UV as either specular or diffusive.

In specific embodiments, multilayer module sidewall materials can include 0.025-0.125 mm thick aluminum foil co-extruded or laminated with 0.025-0.25 mm thick THV film on each side and the resulting assembly glued on a suitable backing layer, such as, 1-6 mm thick PVC, polycarbonate, or 1-3 mm stainless steel or anodized aluminum sheet. Another multilayer sidewall material is 0.025-0.125 mm thick aluminum foil laminated with 0.025-0.125 mm thick PTFE film on each side and the resulting assembly glued on a suitable backing layer, such as, 1-6 mm thick PVC, polycarbonate, or 1-3 mm stainless steel or anodized aluminum sheet. Another multilayer sidewall material is 1-6 mm thick PTFE sheet with one of the above laminated or co-extruded layers as the backing layer. Another multilayer sidewall material is 0.25-0.8 mm thick aluminum laminated with 0.025-0.125 mm thick PTFE film on each side without any backing layer.

Figure 6:
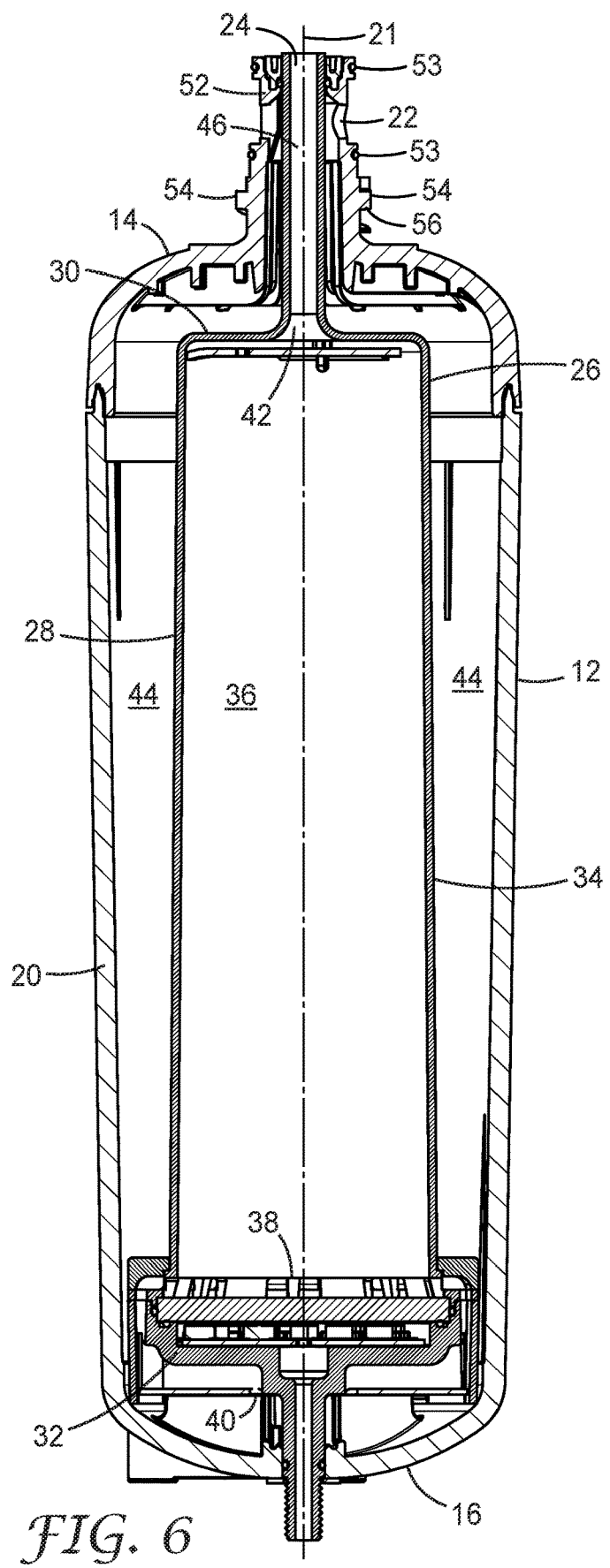
FIG. 6 illustrates a longitudinal cross section of the embodiment of FIG. 5.

Referring now to FIGS. 5-8, another embodiment of the water purification cartridge is illustrated. A UV treatment cartridge with an exterior housing 12 having a first exterior end 14, a second exterior end 16, and a longitudinally extending exterior sidewall 20 connecting the first exterior end and the second exterior end is illustrated. A central longitudinal axis 21 is shown in FIG. 6 for clarity. A cartridge fluid inlet 22 and a cartridge fluid outlet 24 are provided extending through the exterior housing 12 to allow for fluid to enter and exit the UV treatment cartridge. The exterior housing encloses a separate UV treatment module 26. The UV treatment module 26 includes an interior housing 28 having a module first end 30, a module second end 32, and a longitudinally extending module sidewall 34 connecting the module first end 30 and the module second end 32 and enclosing a UV treatment chamber 36. The module first end 30 is adjacent to the first exterior end 14. An array of UV light emitters 38 are located adjacent to either the module first end or the module second end directing UV light into the UV treatment chamber 36. A module fluid inlet 40 and a module fluid outlet 42 both extending through the interior housing 28 are provided to allow for fluid to enter and exit the UV treatment module 26. The UV treatment cartridge further includes an internal annular space 44 forming an entry flow path between the exterior sidewall 20 and the module sidewall 34 fluidly connecting the cartridge fluid inlet 22 to the module fluid inlet 40 and a fluid exit flow path 46 from the module fluid outlet 42 to the cartridge fluid outlet 24.

The treatment cartridge is a quick disconnect style that allows for hand installation into a compatible manifold that is plumbed into the water supply system. Hand installation of the treatment cartridge allows for removal and installation of the treatment cartridge into the compatible manifold without the use of any tools such as would be required to install the compatible manifold and plumb it into the existing water supply system. As such, the treatment cartridge includes a tool free quick disconnect manifold engagement member 50. The manifold engagement member 50 can be selected from the group consisting of: a bayonet connection; a radially extending lug such as a ramped lug, a helical lug, or a Z-thread lug; a longitudinally extending fluid cartridge inlet prong and a longitudinally extending fluid cartridge outlet prong; a stem extending from the exterior housing with the fluid cartridge inlet and the fluid cartridge outlet, the stem can be either circular, oval, or other shape; a quarter-turn connection; or a lug with an arcuate bottom surface such as a half round circular section that acts as an engaging cam to lock the filter onto the manifold. Other tool free quick disconnect manifold engagement members can be used as known to those of skill in the art. Tool free quick disconnect treatment cartridges and manifolds often employ one of more O-rings 53 to provide a fluid tight seal instead of flanges, threads, gaskets, or other seals used for water connections requiring fasteners and tools to tighten them to prevent water leakage. The O-rings can be located on either the manifold portion, the treatment cartridge portion, or on both.

In one embodiment, the manifold engagement member 50 comprises a stem 52 extending longitudinally from the first exterior end 14 having the cartridge fluid inlet 22 in the side of the stem and a longitudinally extending cartridge fluid outlet 24 on the end of the stem. In various embodiments, the cartridge fluid inlet and cartridge fluid outlet can both be oriented radially into the stem's side for balanced flow forces, or one can be orientated radially and the other longitudinally, or both can be orientated longitudinally. The stem 52 also includes two radially extending opposing lugs 54 having lower cam surfaces 56 that engage compatible ramps in the corresponding manifold for a quick disconnect coupling of the treatment cartridge to the manifold by rotating the treatment cartridge about the longitudinal axis by hand approximately one-quarter turn.

Figure 10:
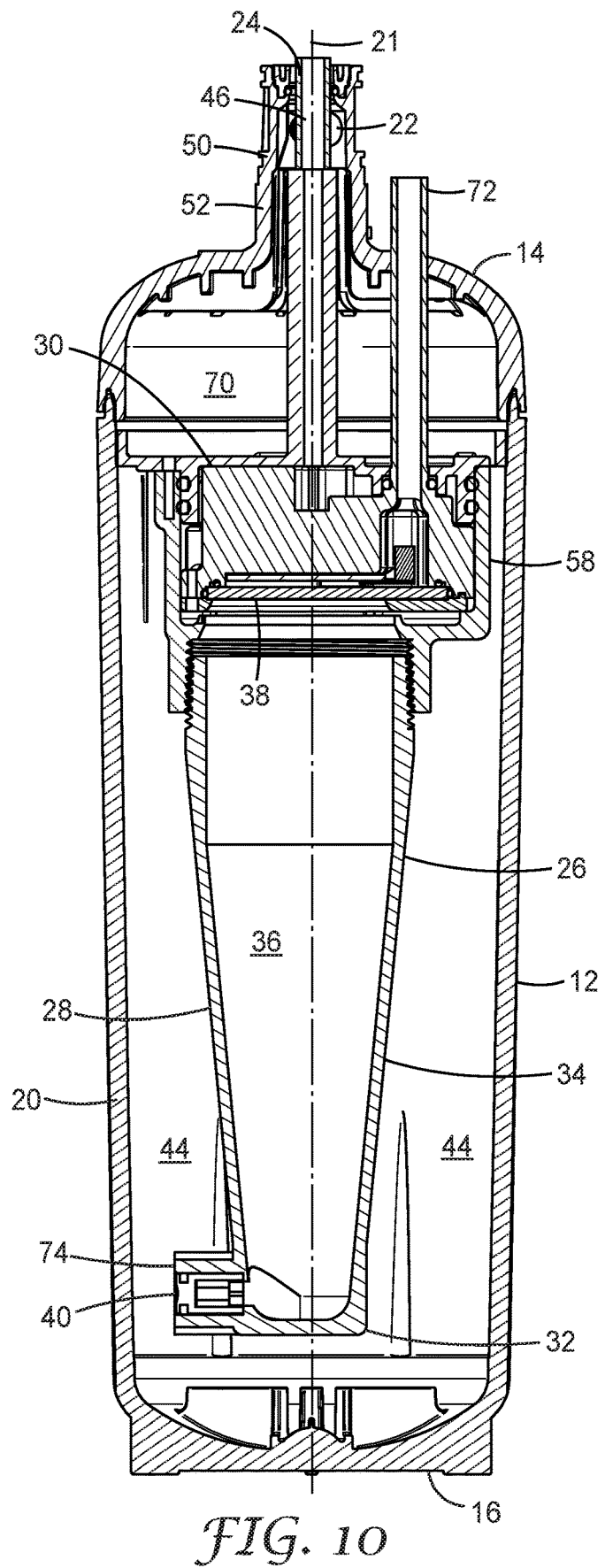
FIG. 10 illustrates a longitudinal cross section of another embodiment of a water treatment cartridge.

In many embodiments, such as FIG. 6 or FIG. 10, the first exterior 14 end is an integral molding comprising a cap having the stem 52 extending from the cap with the manifold engagement member 50, the cartridge fluid inlet 22 and the cartridge fluid outlet 24. The cap is often spun welded or adhesively bonded to a sump comprising an integral molding of the second exterior end 16 and the exterior sidewall 20. The UV treatment module 26 can be inserted into the sump, and then the cap can be positioned and bonded to the sump as best seen in FIGS. 6 and 10.

Figure 7:
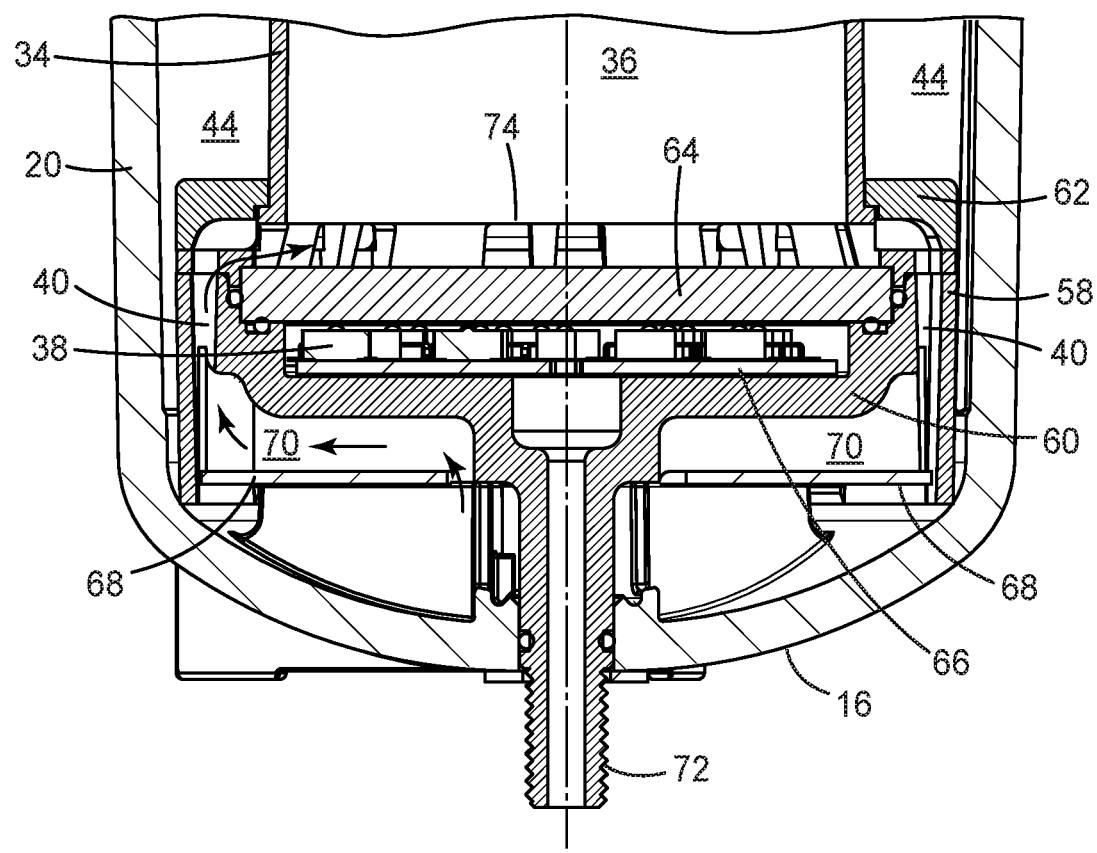
FIG. 7 illustrates a partial longitudinal cross section of the bottom of the treatment cartridge of FIG. 5.
Figure 8:
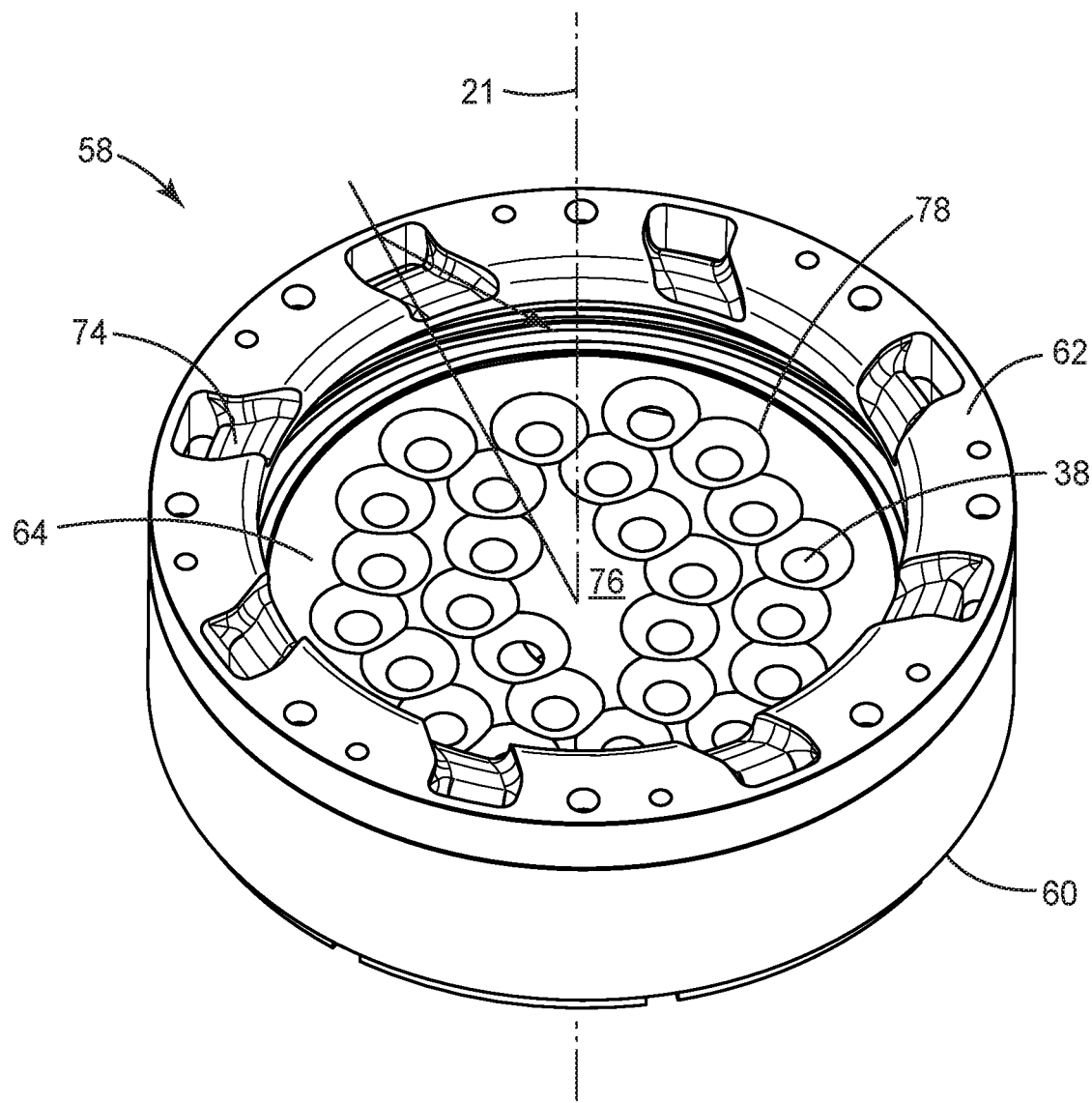
FIG. 8 illustrates a UV array.

Referring now to FIGS. 7 and 8, the array of UV LED light emitters 38 can be optionally disposed into an UVLED housing 58. The UVLED housing 58 can be generally cylindrical resembling a hockey puck. The main components of the UVLED housing 58 are a lower housing 60, an upper housing 62, a quartz or UV transparent disc 64, and a circuit board 66 with drivers having the array of UV LED light emitters 38.

The lower housing 60 can contain a plurality of module fluid inlets 40 disposed around the perimeter of the lower housing 60. An optional flow deflector plate 68 can be attached to the lower housing 60 to create a module inlet flow path 70 between the flow deflector plate and the lower housing. The flow deflector plate 68 causes the fluid to enter near the center of the flow deflector plate 68 and then flow parallel to the lower housing 60 before turning 90 degrees into the plurality of module fluid inlets 40. This tangential flow path helps to cool the lower housing 60 which acts as a heat sink for the array of UV LED light emitters 38. The lower housing 60 also comprises an electrical conduit 72 or opening connecting the UVLED housing to the exterior housing 12 and passing power wires and/or data communication wires to the circuit board 66 through both the exterior housing and the interior housing.

The fluid after entering the plurality of module fluid inlets 40 passes generally parallel to the longitudinal axis and then exits the UVLED housing 58 through a plurality of radially angled swirl ports 74. The swirl ports 74 are angled relative to a line passing through the longitudinal axis and the center of the swirl port, and designed to impart a radial flow component to the fluid such that it swirls and mixes about the longitudinal axis as it enters the UV treatment chamber 36. This helps to ensure that all of the entering fluid is subjected to the UV LED light enhancing the disinfecting capability of the UV treatment. The swirl ports 74 may also be designed to direct the flow initially tangentially along the surface of the quartz disc 64 to assist in removing debris from its surface and helping to keep the surface of the quartz disc 64 clean. Alternatively other fluid ports can be used to bring the fluid into the UV treatment chamber 36.

A magnified cross-section of the UV treatment module near the UVLEDs is shown in FIG. 7. The UVLEDs are mounted on a printed circuit board (PCB) at the bottom end of the treatment cartridge having a tool free quick disconnect manifold engagement member. The PCB is in thermal contact with a heat sink such as the lower housing 60 to dissipate the heat generated by the UVLEDs to the fluid to be treated. This is desirable in order to prevent the UVLEDs from overheating which can adversely affect their output and longevity. The lower housing 60 can be connected to a threaded tube which acts as the electrical conduit 72 for the wiring needed by the UVLED module. Since the UVLEDs are mounted within the UVLED housing and since the UVLED housing is positioned on one end of the UV treatment module, their electrical isolation, thermal management, and wiring is much simpler than if the UV lights were positioned uniformly throughout the treatment chamber.

The UVLED housing 58 seals the liquid from contact with the array of UV LED light emitters 38 by using a fluid sealed UVLED housing having the quartz disc 64 positioned over the array of UVLED light emitters 38. It may be preferable to minimize the air gap between the top surface of the UVLEDs and the bottom surface of the quartz disc for more UV light projection into the liquid being treated. As seen in FIG. 7, the UVLED light emitters can be touching the bottom surface of the quartz disk. When a large air gap is present, some UV light emitted from the UVLED might be reflected back by the quartz disc and absorbed into the surface of the circuit board or other surfaces within the UVLED housing 58 resulting in a loss. In addition, refracted or reflected UV light from within the UV treatment chamber 36 can pass back though the quartz disc and also get absorbed by the circuit board. The above losses can be reduced by minimizing this air gap with the help of a UV transparent fluoropolymer film, such as, PTFE or THV on the surface of the quartz disk facing the UVLED array. Furthermore, a UV reflective layer (e.g. aluminum foil) may be placed underneath the UV transparent film to reflect any incoming UV back towards the liquid. This reflective film can be apertured into a reflector 76 with a plurality of holes 78, the size and pattern of which matches that of the array UVLEDs in order to allow UV light emitted from the UVLEDs to pass through as shown in FIG. 8. The reflector is placed over the UVLED array with each UVLED positioned within one of the apertures.

Additionally, the surface of the quartz disc 64 in contact with the liquid may be covered with a fluoropolymer layer such as PTFE or THV. This layer may be in the form of a coating or a thin film. It is believed that such a construction provides two key benefits: 1. The fluoropolymers can have low surface energy which reduces fouling of the surface due to, for example, scale formation, which absorbs UV light and reduces the UV energy that is delivered to the liquid; and 2. Due to its light diffusing properties, PTFE creates a uniform distribution of UV emitting from its surface, resulting in a more effective treatment of the liquid.

Often it is desirable to provide UVLEDs with constant current drivers and balancing chips for optimal operation. A constant current source helps to assure a consistent optical output from the UVLEDs and a predictable level of UV dosing while minimizing variability due to voltage or thermal effects. For one circuit variation, current balancing circuits can be used to simplify the wiring into and out of the chamber, and maintain the desired electrical current ratio between each LED string or bank of lights. Using this method to energize the UVLED allows for enhanced system scalability. In this type of design, changing the current of the single LED driver affects all of the UVLEDs in that circuit. However, changing the number of UVLEDs does not change the current in any one circuit string of UVLEDs. Additionally, if one UVLED string of emitters fails or open circuits, the current to the other (one or more) UVLED string of emitters compensates so that the total optical output will be approximately the same.

Figure 9:
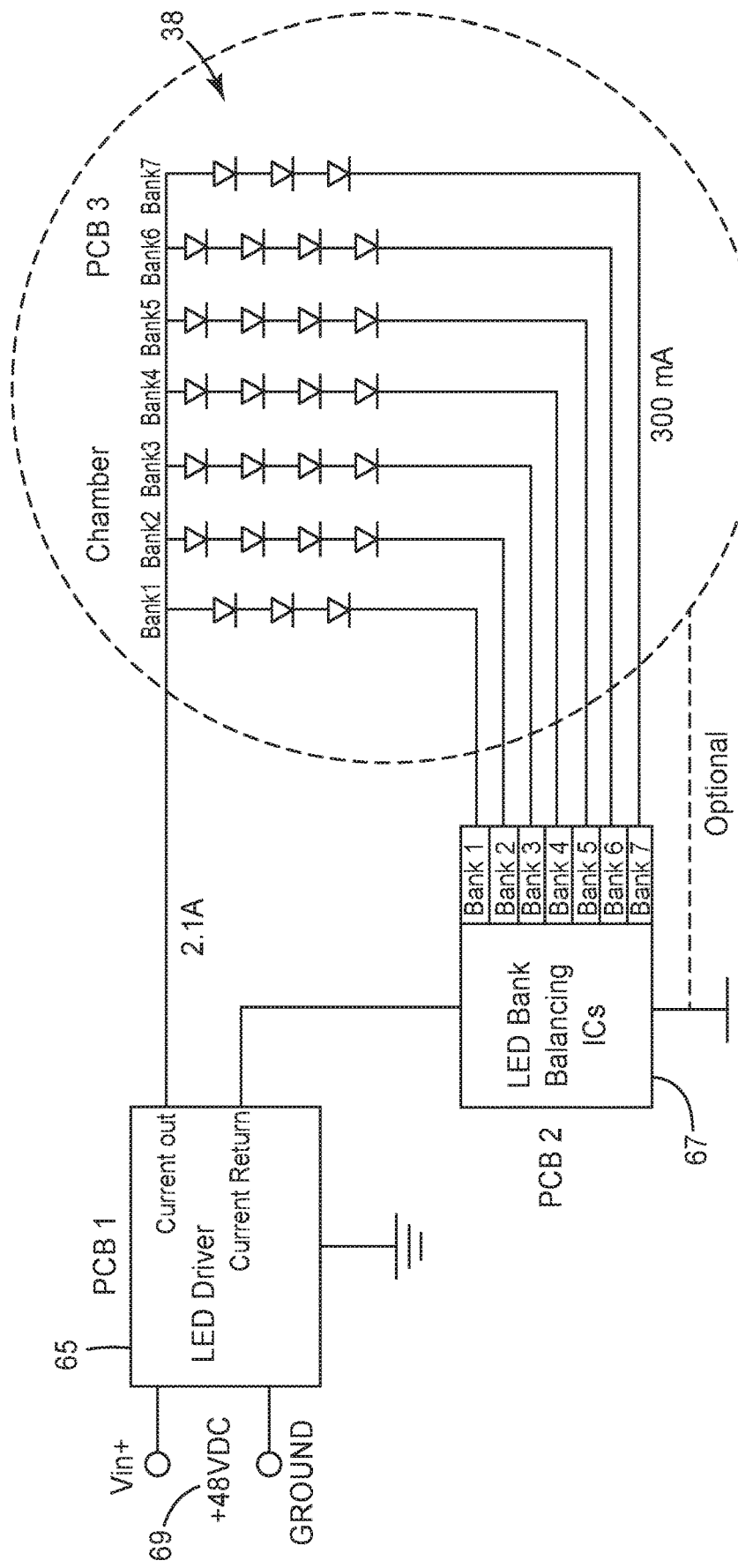
FIG. 9 illustrates a circuit board diagram for the UV light emitting diode (UVLED) array.

Referring to FIG. 9 an electrical circuit is shown for operating the array of UVLEDs. The number of drivers 65 and balancing chips 67 needed depend, among other things, on the supply voltage. One possible arrangement with a 48 VDC supply voltage 69 is shown. In this example, there are a total of 26 UVLEDs forming the UVLED array 38, divided into seven different strings or banks, each running at a current of 300 mA driven from a single LED driver 65 and a single balancing chip 67 having seven outputs.

In some embodiments, the UVLEDs can act as both an emitter and a detector of UV light forming a system. The system includes multiple devices configured to operate in radiation emitting mode and radiation detecting mode. Each of the devices, when used in conjunction with appropriate circuitry, emits and detects radiation that is germicidal in wavelength and intensity. The system includes at least one drive source, wherein each of the multiple devices operates in emitting mode when connected to the drive source in a forward bias configuration and operates in detecting mode when disconnected from the drive source or when connected to the drive source in a reverse bias configuration. Switching circuitry is coupled to each of the devices and to the drive source. Cycling circuitry generates a sequence of control signals that control the switching circuitry to change the connections of the devices to the drive source in a cycle in which one or more of the multiple devices is switched to detecting mode and senses radiation emitted by one or more of the multiple devices simultaneously operating in emitting mode. Each device operating in detecting mode generates a signal in response to the sensed radiation. Detection circuitry detects signals of the devices operating in detecting mode and generates a detection output in response to the detected signals. Further information about this mode of operation for the UVLEDs is included in PCT application number PCT/US2016/067442 entitled "Disinfecting System with Performance Monitoring" filed on Dec. 19, 2016 and herein incorporated by reference.

Figure 11:
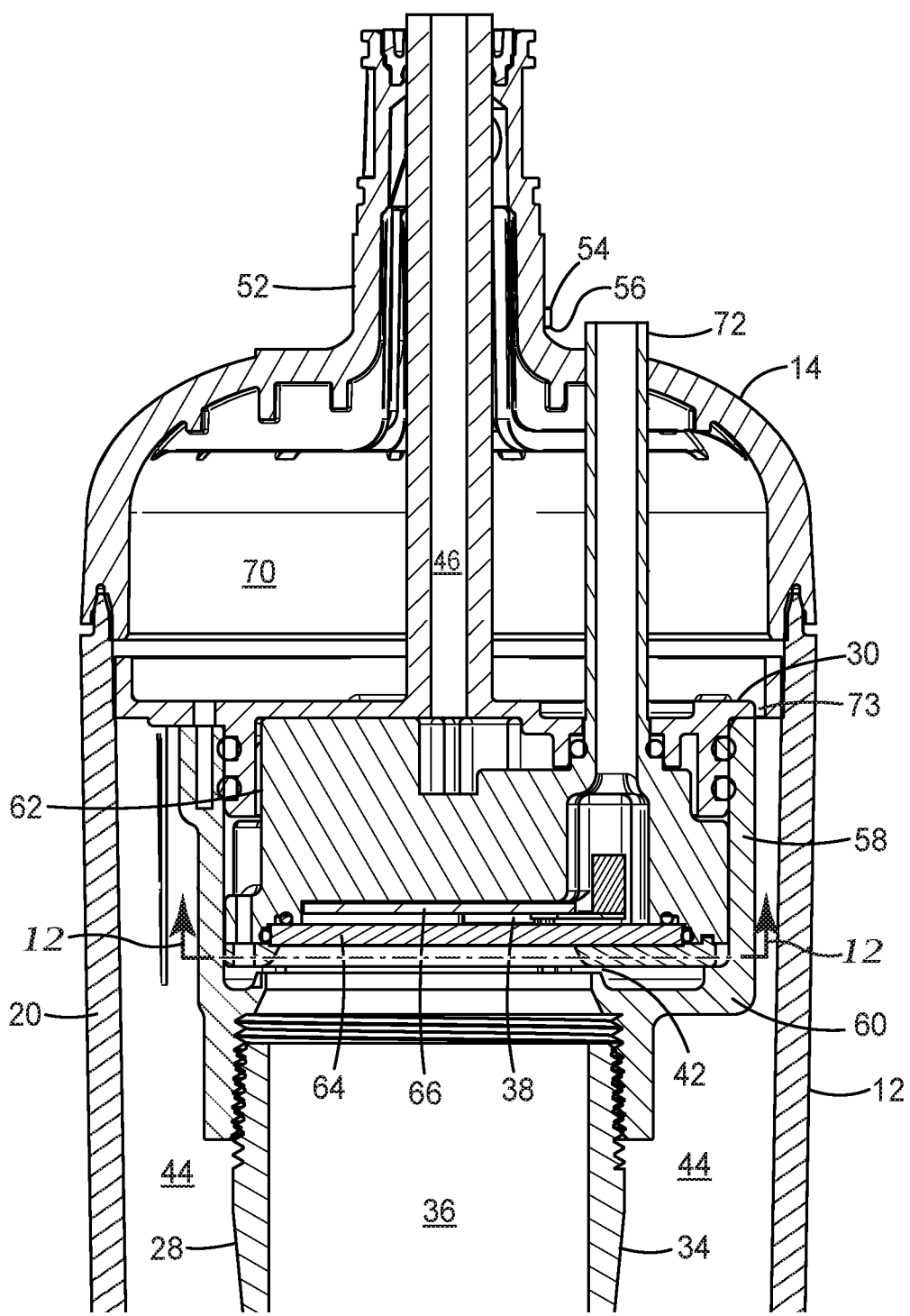
FIG. 11 illustrates a longitudinal partial cross section of the top of the treatment cartridge of FIG. 10.

Referring now to FIGS. 10-13, another embodiment of the water purification cartridge is illustrated. A UV treatment cartridge with an exterior housing 12 having a first exterior end 14, a second exterior end 16, and a longitudinally extending exterior sidewall 20 connecting the first exterior end and the second exterior end is illustrated. A central longitudinal axis 21 is shown in FIG. 10 for clarity. A cartridge fluid inlet 22 and a cartridge fluid outlet 24 are provided extending through the exterior housing 12 to allow for fluid to enter and exit the UV treatment cartridge. The exterior housing encloses a separate UV treatment module 26. The UV treatment module 26 includes an interior housing 28 having a module first end 30, a module second end 32, and a longitudinally extending module sidewall 34 connecting the module first end 30 and the module second end 32 and enclosing a UV treatment chamber 36. The module first end 30 is adjacent to the first exterior end 14 and an optional inlet chamber 70 is present between UV treatment module 26 and the cartridge fluid inlet 24 and fluidly connected with internal passages in the stem 52 to the fluid cartridge inlet 22. The inlet chamber feeds 70 a plurality of internal inlet slots 73 located around the top perimeter of UVLED housing 58 feeding the internal annular space 44 in a distributed manner. The UVLED housing 58 separates the inlet chamber 70 from the internal annular space 44 as best seen in FIG. 11.

An array of UV light emitters 38 are located adjacent to the module first end 30 directing UV light into the UV treatment chamber 36. In this embodiment, the UV treatment chamber tapers such that the cross section is smaller near the module second end 32 located adjacent to the second exterior end 16 and the cross section is larger near the module first end 30 forming a tapered conical shape. The tapered conical UV treatment chamber of FIG. 10 is believed to offer the following advantages over the UV treatment chamber of FIG. 6: (a) UV light inside the UV treatment chamber is more uniformly distributed, (b) fluid flow dynamics are enhanced through elimination of "dead" zones associated with sudden changes in flow cross-section, leading to a narrow residence time distribution. Together, these advantages help achieve a narrow UV dose distribution to pathogens, thus increasing the microbial performance (i.e. LRV—log reduction value) of the cartridge.

In operation, it is preferred that the treatment cartridge 12 is oriented such that the longitudinal axis 21 is substantially aligned with the force of gravity and/or the first exterior end 14 is higher relative to the force of gravity the second exterior end 16 as shown in FIG. 10. This has the advantage that any particles or debris present do not settle onto the surface of the quartz or UV transparent disc 64 and block or diminish the UV light transmission into the treatment chamber 36.

A module fluid inlet 40 and a module fluid outlet 42 both extending through the interior housing 28 are provided to allow for fluid to enter and exit the UV treatment module 26. In this embodiment, a check valve 74 is located between the module fluid inlet 40 and the UV treatment chamber 36 such that fluid present in the UV treatment chamber cannot flow back into the internal annual space 44. The check valve can be used with any of the embodiments discussed herein. This allows for the UVLEDs to be shut off after treating the water in the UV treatment chamber when there is no demand for water without the risk of contamination from water present in the internal annular space 44 that has not yet been treated. When there is a demand for water, it can be instantly delivered from the treatment chamber without any delay. The UVLED's can again be energized and treat any new incoming water to the treatment chamber.

The UV treatment cartridge further includes the internal annular space 44 forming an entry flow path between the exterior sidewall 20 and the module sidewall 34 fluidly connecting the cartridge fluid inlet 22 to the module fluid inlet 40 and a fluid exit flow path 46 from the module fluid outlet 42 to the cartridge fluid outlet 24.

The treatment cartridge is a quick disconnect style that allows for hand installation into a compatible manifold that is plumbed into the water supply system. Hand installation of the treatment cartridge allows for removal and installation of the treatment cartridge into the compatible manifold without the use of any tools such as would be required to install the compatible manifold and plumb it into the existing water supply system. As such, the treatment cartridge includes a tool free quick disconnect manifold engagement member 50 as previously discussed for the embodiment of FIG. 5.

In one embodiment, the manifold engagement member 50 comprises a stem 52 extending longitudinally from the first exterior end 14 having the cartridge fluid inlet 22 in the side of the stem and a longitudinally extending cartridge fluid outlet 24 at the end of the stem. In various embodiments, the cartridge fluid inlet and cartridge fluid outlet can both be oriented radially into the side of the stem for balanced flow forces, or one can be orientated radially and the other longitudinally, or both can be orientated longitudinally. The stem 52 also includes two radially extending lugs 54 having lower cam surfaces 56 that engage compatible ramps in the corresponding manifold for a quick disconnect coupling of the treatment cartridge to the manifold by rotating the treatment cartridge about the longitudinal axis by hand approximately one-quarter turn.

Figure 12:
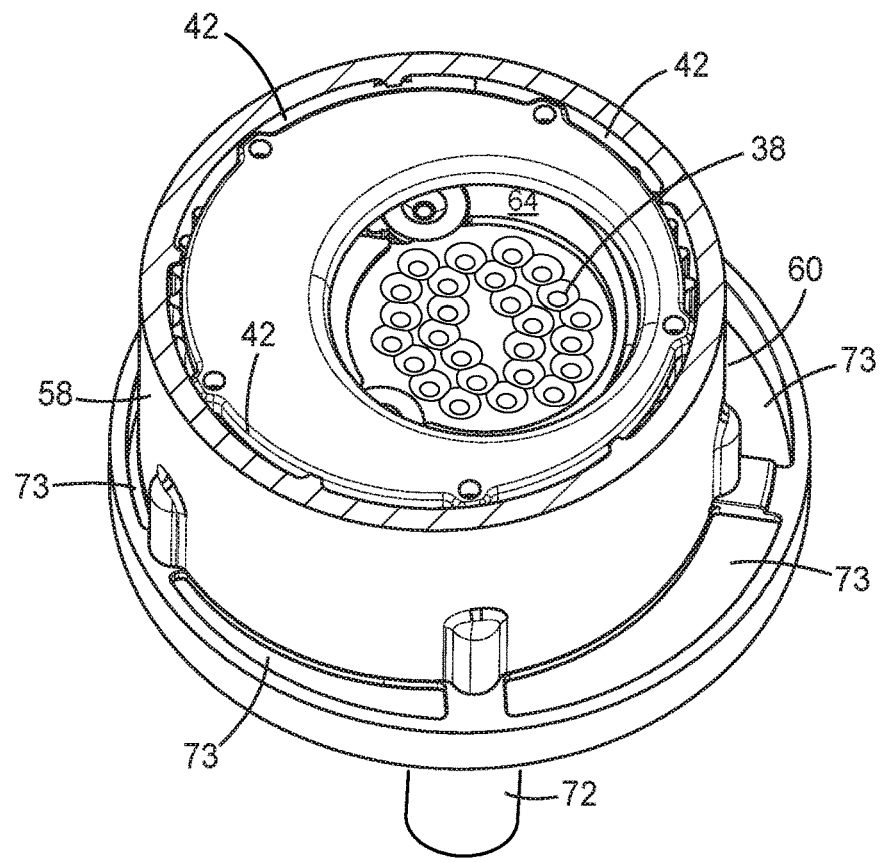
FIG. 12 illustrates a cross section of the UVLED housing used in the embodiment of FIG. 11 taken at 12-12.
Figure 13:
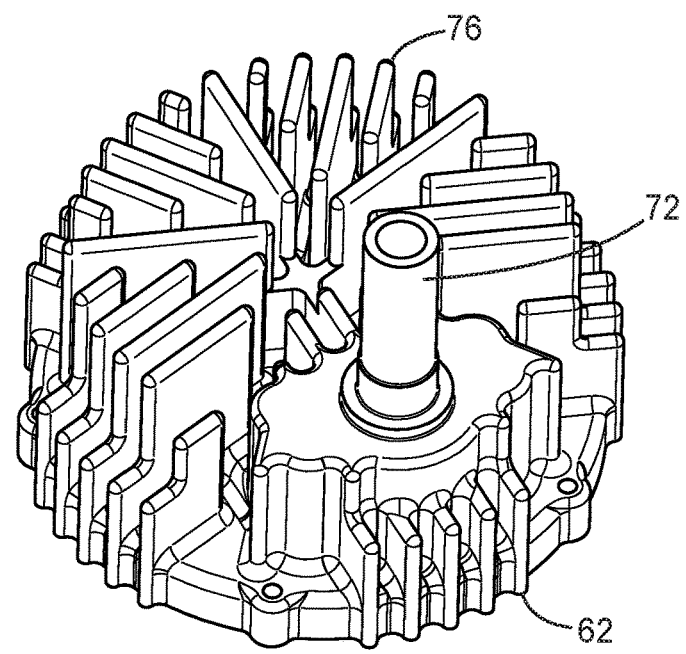
FIG. 13 illustrates the top of the UVLED housing used in the embodiment of FIG. 10.

Referring now to FIGS. 11-13, the array of UV LED light emitters 38 can be optionally disposed into a UVLED housing 58. The UVLED housing 58 can be generally cylindrical. The main components of the UVLED housing 58 are a lower housing 60, an upper housing 62, a quartz or UV transparent disc 64, and a circuit board 66 with drivers having the array of UVLED light emitters 38.

The lower housing 60 can contain a plurality of module fluid outlets 42. In this embodiment, the module fluid outlets comprise radial slots disposed about the bottom perimeter of the lower housing 60 after the threaded section that is used to attach the internal tapered sump comprising the module second end 32, module fluid inlet 40, check value 74 and tapered module sidewall 34. Thus the UV treatment module 26 is an assembly of the internal tapered sump and the UVLED housing 58.

As best seen in FIGS. 12-13, the fluid flows over the quartz or UV transparent disc 64, is routed through the radial slots 42 forming the module fluid outlet 42 and then directed onto the upper housing 62. The upper housing 62 comprises a plurality of cooling fins 76. The cooling fins act as a heat sink for the array of UVLED light emitters 38 are disposed in the outlet flow path of the fluid to the cartridge outlet 24. The fluid then moves through the fluid exit flow path 46 to the cartridge outlet 24. The upper housing 62 also comprises an electrical conduit 72 or opening connecting the UVLED housing to the exterior housing 12 for passing power wires and/or data communication wires to the circuit board 66 through both the exterior housing and the interior housing.

The UVLED housing 58 seals the liquid from contact with the array of UVLED light emitters 38 by using a fluid sealed UVLED housing having the quartz or UV transparent disc 64 positioned over the array of UV LED light emitters 38. It may be preferable to minimize the air gap between the top surface of the UVLEDs and the bottom surface of the quartz disc for more UV light projection into the liquid being treated. When a large air gap is present, some UV light emitted from the UVLED might be reflected back by the quartz disc and absorbed into the surface of the circuit board or other surfaces within the LED housing 58 resulting in a loss. In addition, refracted or reflected UV light from within the UV treatment chamber 26 can pass back though the quartz disc and also get absorbed. The above losses can be reduced by minimizing this air gap with the help of a UV transparent fluoropolymer film, such as, PTFE or THV. Furthermore, a UV reflective layer (e.g. aluminum foil) may be placed underneath the UV transparent film to reflect any incoming UV back towards the liquid. Optionally, this reflective film can be apertured, the size and pattern of which matches that of the array UVLEDs in order to allow UV light emitted from the UVLEDs to pass through. The optional reflector can be placed over the UVLED array with each UVLED positioned within one of the apertures.

Additionally, the surface of the quartz of UV transparent disc 64 in contact with the liquid may be covered with a fluoropolymer layer, such as, PTFE or THV. This layer may be in the form of a coating or a thin film. It is believed that such a construction provides two key benefits: 1. the fluoropolymers can have low surface energy which reduces fouling of the surface due to, for example, scale formation, which absorbs UV light and reduces the UV energy that is delivered to the liquid; and 2. due to its light diffusing properties, PTFE creates a uniform distribution of UV emitting from its surface, resulting in a more effective treatment of the liquid.

Often it is desirable to provide UVLEDs with constant current drivers and balancing chips for optimal operation. A constant current source helps to assure a consistent optical output from the UVLEDs and a predictable level of UV dosing while minimizing variability due to voltage or thermal effects. For one circuit variation, current balancing circuits can be used to simplify the wiring into and out of the chamber, and maintain the desired electrical current ratio between each LED string or bank of lights. Using this method to energize the UVLED allows for enhanced system scalability. In this type of design, changing the current of the single LED driver affects all of the UVLEDs in that circuit. However, changing the number of UVLEDs does not change the current in any one circuit string of UVLEDs. Additionally, if one UVLED string of emitters fails or open circuits, the current to the other (one or more) UVLED string of emitters compensates so that the total optical output will be approximately the same. A circuit the same or similar to that discussed for FIG. 9 can be used to energize the UVLED array.

In some embodiments, the UVLEDs can act as both an emitter and a detector of UV light forming a system. The system includes multiple devices configured to operate in radiation emitting mode and radiation detecting mode. Each of the devices, when used in conjunction with appropriate circuitry, emits and detects radiation that is germicidal in wavelength and intensity. The system includes at least one drive source, wherein each of the multiple devices operates in emitting mode when connected to the drive source in a forward bias configuration and operates in detecting mode when disconnected from the drive source or when connected to the drive source in a reverse bias configuration. Switching circuitry is coupled to each of the devices and to the drive source. Cycling circuitry generates a sequence of control signals that control the switching circuitry to change the connections of the devices to the drive source in a cycle in which one or more of the multiple devices is switched to detecting mode and senses radiation emitted by one or more of the multiple devices simultaneously operating in emitting mode. Each device operating in detecting mode generates a signal in response to the sensed radiation. Detection circuitry detects signals of the devices operating in detecting mode and generates a detection output in response to the detected signals. Further information about this mode of operation for the UVLEDs is included in U.S. patent application Ser. No. 62/270,861 entitled "Disinfecting System with Performance Monitoring" filed on Dec. 22, 2015 and herein incorporated by reference.

Example 1

A prototype similar to the embodiment of FIGS. 5-9 was built. The UVLEDs were obtained from Crystal IS of Troy, N.Y. Each UVLED had a germicidal power output of about 10 mW and there were 26 UVLEDs in total. The UVLEDs were rated by the manufacturer for up to 300 mA forward current. The output wavelength spectrum of the UVLEDs was measured with the help of a UV spectroradiometer and the peak wavelength of the UVLEDs was found to be about 260 nm which is close to the wavelength at which DNA absorption is maximum.

The prototype treatment cartridge was tested for microbial performance. The test water parameters were as follows: pH=7.4-8.0, turbidity=0.14-0.23 NTU, TDS=170-280 ppm, free chlorine <0.02 ppm, UVT @ 260 nm=97%, and temperature=20 C. The challenge organism was MS-2 coliphage with a concentration ranging between $1.2 \times 10^5$ and $4 \times 10^5$ PFU/mL.

Figure 14:
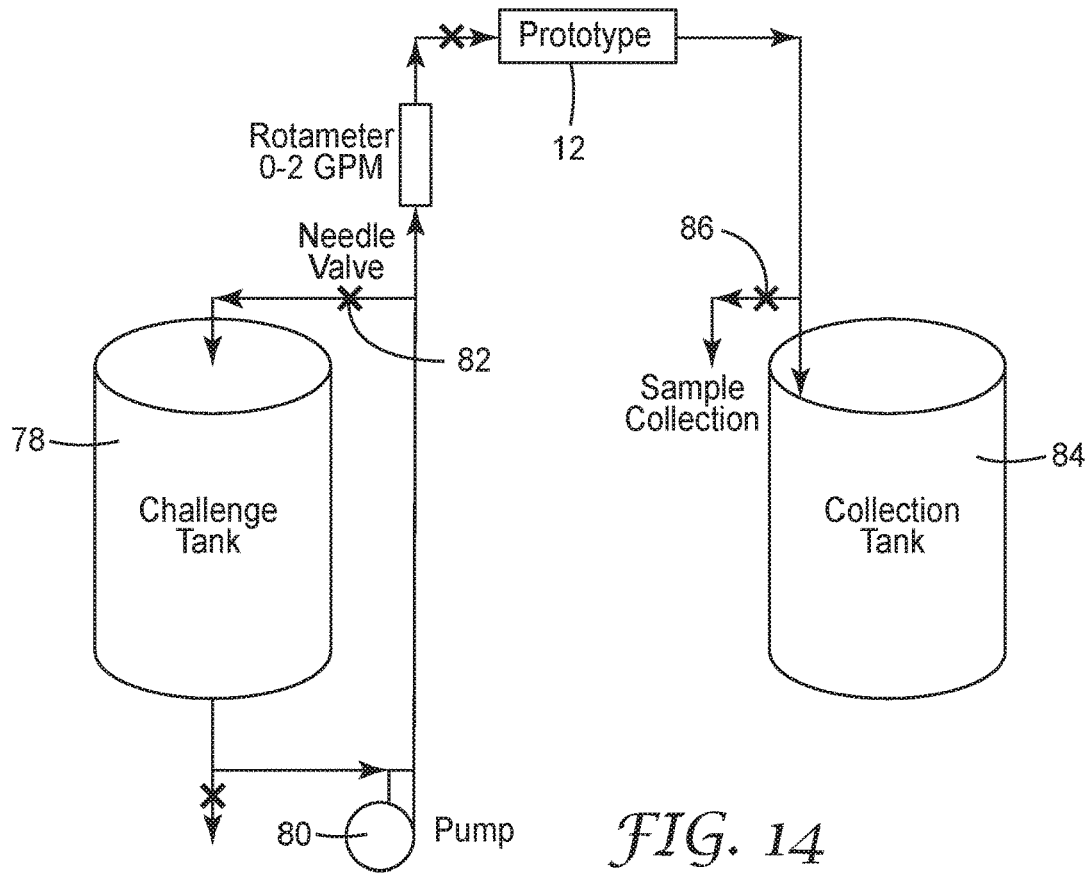
FIG. 14 illustrates the experimental apparatus used to measure the microbial performance of a UVLED water treatment cartridge.

The test apparatus used is shown in FIG. 14, which had a 30 gallon challenge tank 78 into which the test water is mixed with the challenge microorganism. A rotary diaphragm pump 80 helps circulate the challenge water in a flow loop. By adjusting a needle valve 82 in the water return line to the challenge tank 78, any flow rate between 0-2 gpm can be obtained. After passing through the prototype UV treatment cartridge 12, the water was collected in a second 30 gallon tank 84. Treated samples were collected at a sample port 86. Untreated samples were collected with the UVLED's turned off. UV treated samples were collected at the same port when the UVLED's were on for at least three times the residence time, which was defined as the void volume of the treatment chamber 36 divided by the water flow rate. For the prototype treatment cartridge, the residence time was 12 seconds and 24 seconds at the flow rates of 1 gpm and 0.5 gpm, respectively. At each flow rate, five replicates, untreated as well as treated, were ran to determine experimental variability. The log reduction value (LRV) obtained was defined as: $LRV=\log_{0}(N_i/N_e)$, where $N_i$ and $N_e$ is the microbial concentration of the untreated and UV-treated samples, respectively. An experimental control was also included in the evaluation to ensure that the apparatus and methodology was working properly.

Figure 15:
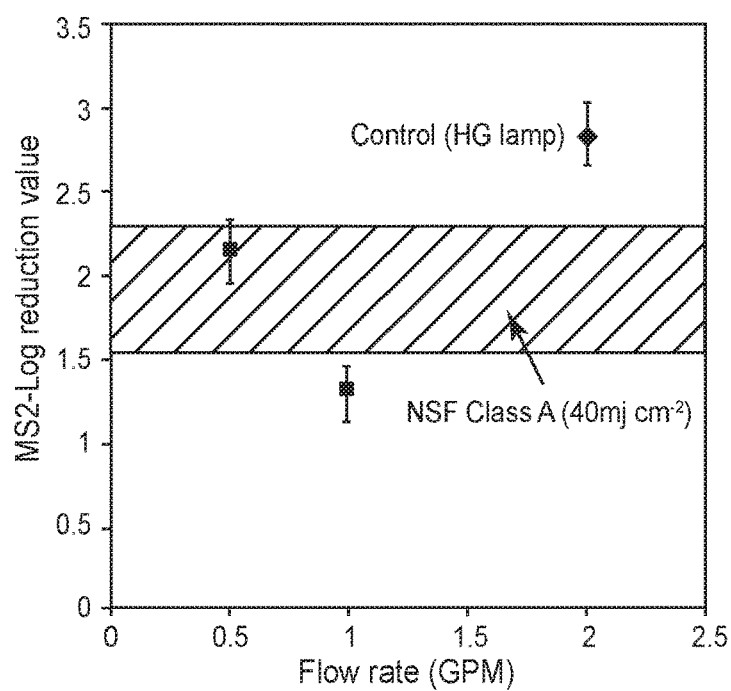
FIG. 15 illustrates the microbial performance results obtained from the UVLED water treatment cartridge.

FIG. 15 shows the log reduction value (LRV) data from the prototype, as well as from an experimental control mercury lamp system (APUV2 available from 3M Purification) as a function of the water flow rate. The shown LRV value is the geometric mean of the five samples while the error bars show the maximum and minimum LRV obtained at a particular flow rate. It is seen that the prototype gives an LRV of 2.2 and 1.3 at flow rates of 0.5 and 1.0 gpm, respectively. Studies by Song et al (K. Song, M. Mohseni, F. Taghipour, *Water Research*, 94 (2016) pp. 341-349) have shown a value of 0.038 $cm^2$ $mJ^{-1}$ for the inactivation rate constant of MS2 with 255 nm UVLEDs. Taking this value as an estimate, the UV dose delivered by the prototype treatment cartridge at a flow rate of 0.5 gpm can be calculated as 2.2/0.038=58 mJ $cm^{-2}$. Similarly, at 1 gpm the UV dose equals 1.3/0.038=34 mJ $cm^{-2}$. To put these UV dose values in context, NSF 55 Class A standard requires a UV dose of 40 mJ $cm^{-2}$, for which the corresponding zone of LRV, obtained with 254 nm mercury lamps, is also shown in the figure. Effective virus treatment for the prototype UV treatment cartridge was demonstrated.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A UV fluid treatment cartridge comprising:
   an exterior housing having a first exterior end, a second exterior end, and an exterior sidewall connecting the first exterior end and the second exterior end;
   a cartridge inlet and a cartridge outlet located on the first exterior end;
   a separate UV treatment module located inside of the exterior housing, the separate UV treatment module comprising:
      an interior housing having a module first end adjacent to the first exterior end, a module second end, and a module sidewall connecting the module first end and the module second end and enclosing a UV treatment chamber; and wherein the module sidewall is a multilayer composite material that comprises at least two layers, and includes a metallic UV opaque layer; and
      an array of UV light emitters attached to the separate UV treatment module directing UV light into the UV treatment chamber;
   a module inlet in the module second end and a module outlet in the first end; and
   an internal annular space forming an entry flow path between the exterior sidewall and the module sidewall fluidly connecting the cartridge inlet to the module inlet; and
   an exit flow path from the module outlet to the cartridge outlet; and
   the array of UV light emitters is located in a fluid sealed UVLED housing disposed within the exterior housing, and a plurality of radially angled swirl ports directing fluid flow out of the UVLED housing and into the treatment chamber imparting a swirling motion about a central longitudinal axis.

2. The UV fluid treatment cartridge of claim 1 wherein the exterior housing comprises a manifold engagement member.

3. The UV fluid treatment cartridge of claim 2 wherein the manifold engagement member comprises a longitudinally extending stem from the first exterior end and at least one lug, and wherein both the cartridge inlet and the cartridge outlet are located on the stem.

4. The UV fluid treatment cartridge of claim 3 wherein the module first end comprises an end cap with the module outlet and an outlet tube extending from the end cap forming the exit flow path, the outlet tube disposed within the stem forming a second annular space between the stem and the outlet tube fluidly connecting the cartridge inlet to the internal annular space.

5. The UV fluid treatment cartridge of claim 1, comprising an electrical port through the housing.

6. The UV fluid treatment cartridge of claim 5 wherein the electrical port is located in the first exterior end or the second exterior end.

7. The UV fluid treatment cartridge of claim 6 wherein the electrical port extends from the first exterior end to the module first end or from the second exterior end to the module second end.

8. The UV fluid treatment cartridge of claim 1 wherein the treatment chamber tapers having a larger cross sectional area on either the first module end or the second module end relative to the opposing module end along the central longitudinal axis.

9. The UV fluid treatment cartridge of claim 8 wherein the module sidewall comprises a truncated cone with the cross sectional area becoming smaller in a direction towards the second module end.

10. The UV fluid treatment cartridge of claim 8 wherein the module sidewall comprises a truncated cone with the cross sectional area becoming smaller in a direction towards the first module end.

11. The UV fluid treatment cartridge of claim 8, wherein the array of UV light emitters is located adjacent to the larger cross sectional area of the treatment chamber.

12. The UV fluid treatment cartridge of claim 1 wherein the fluid sealed UVLED housing forms either the module first end or the module second end.

13. The UV fluid treatment cartridge of claim 1 wherein the fluid sealed UVLED housing comprises a UVLED transparent window and a circuit board within the UVLED housing having the array of UV LED emitters.

14. The UV fluid treatment cartridge of claim 1, comprising a flow deflector plate positioned adjacent to the UVLED housing to direct fluid flow between the flow deflector plate and the fluid sealed UVLED housing.

15. The UV fluid treatment cartridge of claim 1, comprising a plurality of cooling fins extending from the sealed UVLED housing.

16. The UV fluid treatment cartridge of claim 1, wherein the array of UV light emitters comprises a reflector with a plurality of holes positioned to surround each of the UV light emitters.

17. The UV fluid treatment cartridge of claim 1 wherein the multilayer composite material comprises the metallic UV opaque layer as an inner layer and an outer backing layer of a polymer.

18. The UV fluid treatment cartridge of claim 1 wherein the multilayer composite material comprises an inner layer that is UV transparent, a center layer comprising the metallic UV opaque layer, and an outer backing layer of a polymer.

\* \* \* \* \*